Jan. 18, 1955     B. A. NEEDHAM     2,700,095
HEATING AND LIGHTING FIXTURE
Filed Feb. 7, 1951     2 Sheets-Sheet 1

INVENTOR.
Basil A. Needham
BY Maxwell K. Murphy
ATTORNEY.

Jan. 18, 1955 B. A. NEEDHAM 2,700,095
HEATING AND LIGHTING FIXTURE
Filed Feb. 7, 1951 2 Sheets-Sheet 2
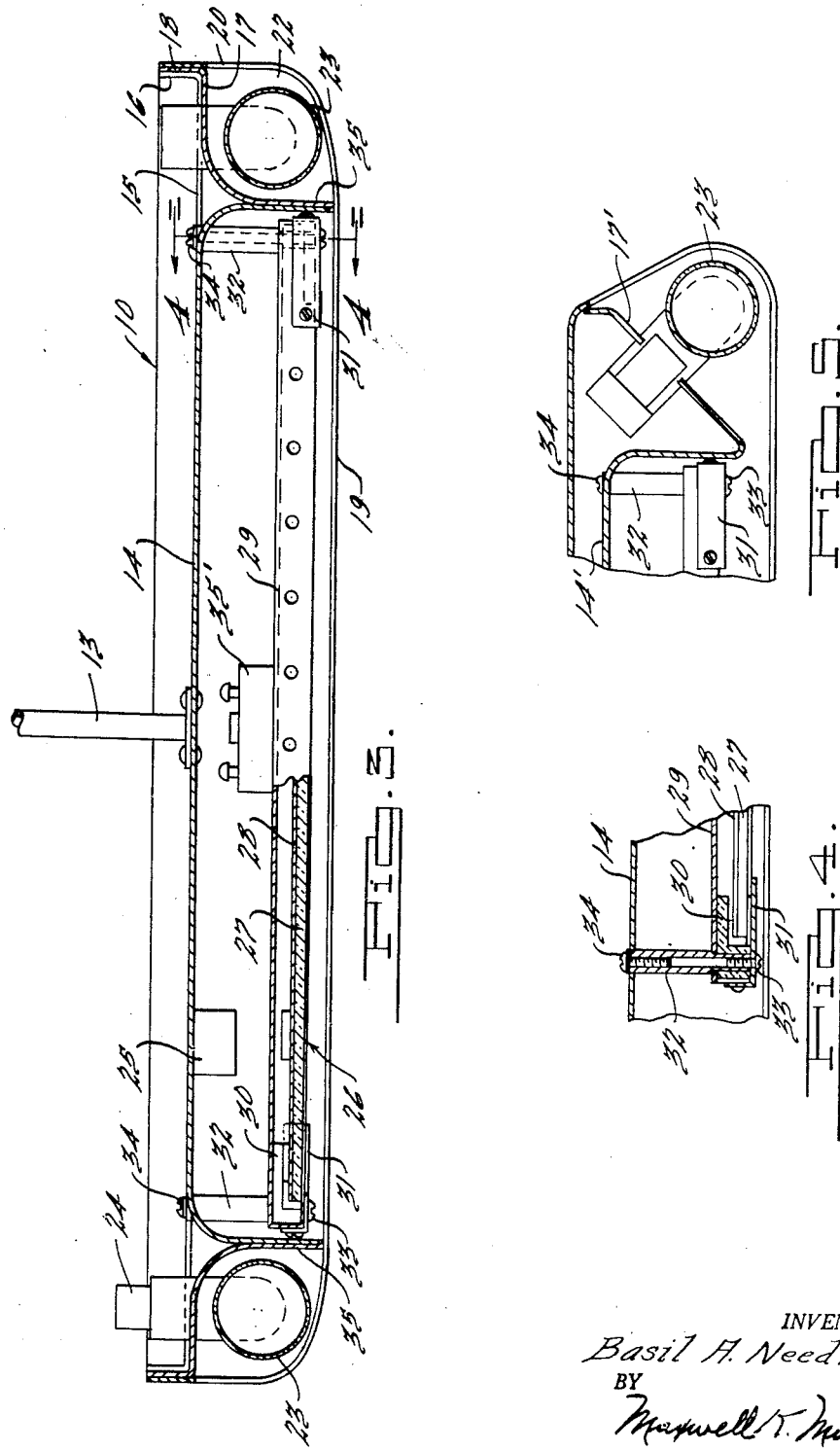
INVENTOR.
Basil A. Needham
BY
Maxwell T. Murphy
ATTORNEY.

2,700,095

HEATING AND LIGHTING FIXTURE

Basil Arthur Needham, Bayside, N. Y., assignor to Continental Radiant Glass Heating Corp., New York, N. Y., a corporation of Michigan Application February 7, 1951, Serial No. 209,759

5 Claims. (Cl. 219—19)

This invention relates to combination heating and lighting fixtures and particularly to a device adapted for installation as a single unit which embodies a radiant heater and fluorescent lighting tubes.

The advantages of fluorescent tubes for lighting are well known and it is the principal object of my invention to provide a radiant heating means in combination with a fluorescent lamp fixture whereby a source of temporary or permanent heat may be instantly available over the lighted area. By combining the lighting and heating devices, only one installation is necessary and only the space in use at the time need be heated.

Another object of the invention is to provide a suitable fixture for mounting the heating and lighting means which permits operation of both at maximum efficiency and protects the fluorescent tubes from excessive heat which is damaging to them.

These and other objects and advantages of the invention will be apparent from the following description which, taken in conjunction with the accompanying drawings, discloses a preferred embodiment of the device.

In the drawings in which reference numerals are used to designate parts referred to in the following specification, Fig. 1 is a perspective view of my combination heating and lighting fixture shown mounted on a ceiling;

Fig. 3 is a sectional view taken in line 3—3 of Fig. 2;

Fig. 4 is a detail section taken in line 4—4 of Fig. 3, and

Fig. 5 is a detail section of a modification of the device.

Figure 1:
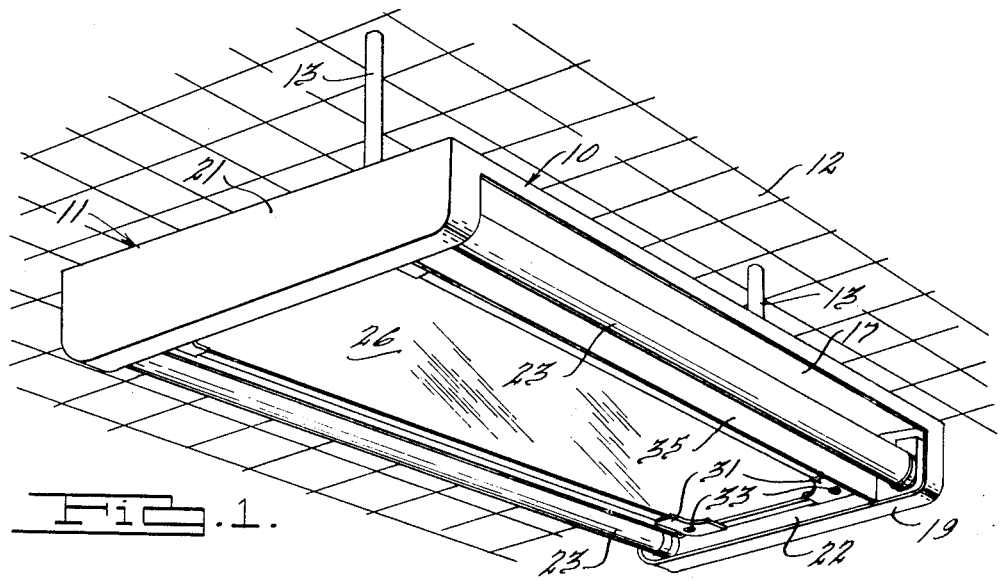
Figure 2:
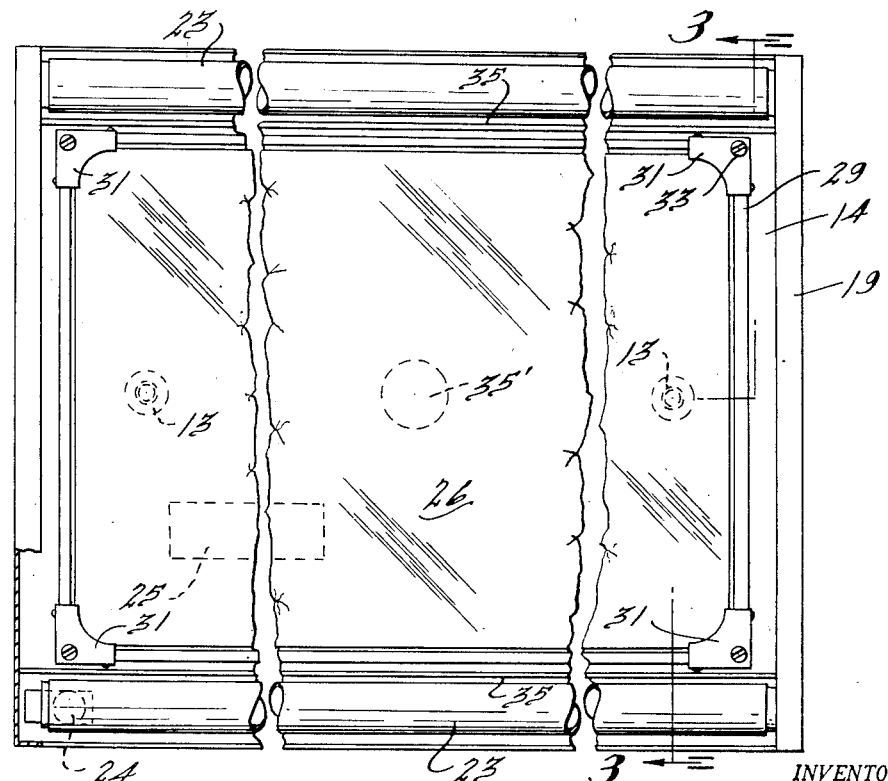
Fig. 2 is a plan view of the fixture from the front or bottom thereof.

Referring to Figs. 1 to 4 inclusive, it may be seen that my combination heating and lighting fixture does not differ widely in appearance from standard fluorescent fixtures and is pleasing to the eye. It comprises a main frame 10 of fabricated sheet metal, having perpendicular end portions 11. Support legs 13 suitably secured to the frame are adapted to be attached to a ceiling 12 when the unit is horizontally mounted. If desired, the panel may be mounted in a wall in vertical position.

The main frame 10 supports a sub-frame member 14 of substantially U-shape at its central portion which is coextensive in length with the unit. At each end the member 14 has laterally extending horizontal portions 15 which terminate in upwardly turned flanges 16. A curved member 17 having an upturned flange 18 extends along each side of the unit between the end portions. The latter are formed of elongated sheet metal members 19 curved upwardly at the ends as shown. The flanges 16 and 18 and the end portion of the member 19 are welded or otherwise secured together to form a rigid structure. A pair of flat wall members 21 and 22 are secured to the members 19 and 14 to provide a box section.

The space bounded by the curved member 17 between the end members forms a trough for the fluorescent tube or lamp 23. There are two lamps, each being mounted in the fixture by means of standard socket mounts. A fluorescent lamp starter 24 and a ballast 25 of conventional type are provided.

The radiant heater, generally designated by numeral 26 comprises a sub-assembly which is demountable as a unit from the fixture. The heating element itself is a glass plate 27 provided on its rear surface with a grid 28 of metallic alloy. The alloy is fused to the glass and is of continuous ribbon form such that when the ends thereof are connected to a source of electricity, the plate is heated and infra-red rays are emitted therefrom. It is of course obvious that any other sheet type heating element of suitable characteristics may be substituted for the glass plate.

The plate 27 is supported in a frame consisting of a pan-like member 29 which has a marginal, reversely bent flange cut away at each corner. The heating plate 27 rests on suitable insulating blocks 30 and is secured in the assembly by retaining members 31. The details of the sub-assembly 26 form no part of the present invention and will be only briefly referred to. For a fuller disclosure of the plate mounting, see the co-pending application of Emil Razlag, Serial No. 208,738 filed in the U. S. Patent Office on January 31, 1951.

The assembly 26 is mounted in the fixture by means of four internally threaded sleeves 32. As may be more readily seen in Fig. 4, each sleeve has a portion of reduced diameter on which the heating unit is secured by a screw 33. The sleeve itself is secured to the member 14 by a similar screw 34.

A thermostat 35' is mounted in the back of the heating assembly and may be of any standard type.

The mounting of the heater 26 in the fixture permits clearance on all sides and the back thereof thereby allowing free circulation of air around the heater. While the device is primarily a radiant heater, some heating by convection is inherent and the fixture is designed to take full advantage thereof.

The fixture is designed to operate on standard 110 volt wiring and is preferably wired with separate switches so that either the heater or the lamps may be switched on and off at will. In some installations, one switch only may be used, the heater thermostat being relied upon to control the heating effect. In installations requiring maximum heating, the heater may be wired for 220 volt operation.

As best shown in Fig. 3, the fluorescent lamps 23 are fully protected from the harmful effect of the heater by separating walls 35. These walls are formed by the downwardly curved legs of the members 14 and 17 and permit cool operation of the lamps under all conditions. The members 17 are preferably highly polished to act as reflectors for the lamps 23.

Fig. 5 illustrates a modification of the device wherein the members 17 are eliminated and the supporting structure for the heater and lamps consists essentially of the end portions and a single member 14'. The latter is secured to the end portions and has upwardly bent wings 17' at each side which carry the lamps 23.

The Fig. 5 construction is more economical to manufacture but not as rugged as the preferred construction.

It may be seen therefore that I have described and shown a simply and economically constructed combination heating and lighting fixture of pleasing appearance which is well adapted for installation in any location where electric power is available. While I have disclosed preferred embodiments of my invention for purposes of illustration, it will be understood that changes in the size, shape, proportion of the parts, etc. may be made without departing from the spirit and scope of the invention as set forth in the appended claims.

I claim:

1. In a combination heating and lighting fixture for ceiling installation, a supporting frame having end portions extending downwardly therefrom; a relatively shallow member of substantially U-shape mounted in said frame and presenting downwardly therefrom; a pair of elongated curved members respectively secured to the legs of said U-shaped member at each side thereof and presenting laterally outwardly of said fixture; a heating plate secured to said frame within the recess of said U-shaped member; and a pair of lamps mounted respectively in said frame adjacent said curved members.

2. In a combination heating and lighting fixture, a supporting frame including a unitary flat piece of sheet metal having side portions intermediate the ends thereof bent downwardly substantially perpendicularly thereof to form a downwardly presenting shallow recess; elongated laterally bent members disposed along said side portions forming respectively recesses open at the sides and bottom; a heating plate mounted in said first recess;

a lamp mounted in each of said second recesses, said plate and lamps being separated by the walls of said recesses.

3. In a combination heating and lighting fixture, a frame; a flat recessed member mounted in said frame, said member having integral side portions disposed laterally of the walls of said recess at an oblique angle relatively thereto; a heating plate mounted in said recess, and lamp mounting means carried by said side portions.

4. In a combination electrically energized heating and lighting fixture adapted for ceiling installation, a horizontal frame having end portions extending downwardly therefrom, a unitary pan-shaped member mounted in said frame having downwardly turned side portions disposed perpendicularly to said end portions within the lateral confines thereof, a radiant heating element of plate form mounted within the recess formed by said side portions and said end portions, and a pair of lamps mounted in said fixture outwardly of and parallel to said side portions and within the lateral confines of said end portions, whereby said side portions separate the heating element and lamps and prevent transfer of heat to the latter.

5. In a combination heating and lighting fixture, a supporting frame having end portions disposed perpendicularly to the central portion thereof, a unitary sub-frame comprising a member having a flat central portion with side portions thereof bent substantially perpendicularly to said central portion then reversely at an oblique angle relatively thereto, said sub-frame being mounted on said supporting frame within the lateral confines of said end portions, a heating element mounted on said sub-frame within the perpendicular side portions thereof, and lamp mounting means carried on the obliquely disposed portions of said sub-frame.

References Cited in the file of this patent

UNITED STATES PATENTS

| Number | Name | Date |
|---|---|---|
| 1,196,073 | Berry et al. | Aug. 29, 1916 |
| 2,283,782 | Ashley et al. | May 19, 1942 |
| 2,359,021 | Campbell et al. | Sept. 26, 1944 |
| 2,439,038 | Cartter | Apr. 6, 1948 |
| 2,485,410 | Pope | Oct. 18, 1949 |
| 2,523,332 | Riehl | Sept. 26, 1950 |
| 2,534,182 | Schwartz et al. | Dec. 12, 1950 |
| 2,536,648 | Lamb | Jan. 2, 1951 |